United States Patent [19]

Hayashi

[11] 3,931,759

[45] Jan. 13, 1976

[54] AUTOMATIC DEVICE FOR FINAL PROOFING

[76] Inventor: Torahiko Hayashi, 2-3 Nozawa-cho, Utsunomiya, Japan

[22] Filed: Feb. 13, 1974

[21] Appl. No.: 441,982

Related U.S. Application Data

[63] Continuation-in-part of Ser. No. 137,397, April 26, 1971, abandoned.

[30] Foreign Application Priority Data

Nov. 25, 1970  Japan.............................. 45-103911

[52] U.S. Cl. ................................................. 99/468
[51] Int. Cl. ........................................... A21c 13/02
[58] Field of Search............................... 99/467, 468

[56] References Cited
UNITED STATES PATENTS

| | | | |
|---|---|---|---|
| 2,020,504 | 4/1935 | Hantla ................................... | 432/99 |
| 3,440,950 | 4/1969 | Moskal ................................... | 99/468 |
| 3,508,881 | 4/1970 | Hagenauer............................. | 99/468 |

Primary Examiner—Harvey C. Hornsby
Assistant Examiner—Alan Cantor
Attorney, Agent, or Firm—Eliot S. Gerber

[57]  ABSTRACT

An automatic device for the final proofing of dough materials, provided with a housing; a number of trays for carrying dough materials, said trays being attached to a pair of chains therebetween, and arranged always to maintain a substantially horizontal position and to incline in the same single direction when left unsupported, said chains being positioned within the housing and arranged to move horizontally and make a U-turn to a higher level at each end of the horizontal path and, upon completion of the movement at the highest level, return to the starting position; a number of vertically arranged openings with valves for the supply of heated gas and/or wet gas, adapted to free adjustment as to the optimum space within the housing for fermentation, thereby enabling the optimum fermentation of the dough materials at any given length of time.

5 Claims, 12 Drawing Figures

INVENTOR.
TORAHIKO HAYASHI
BY
Eliot S. Gerber
ATTORNEY

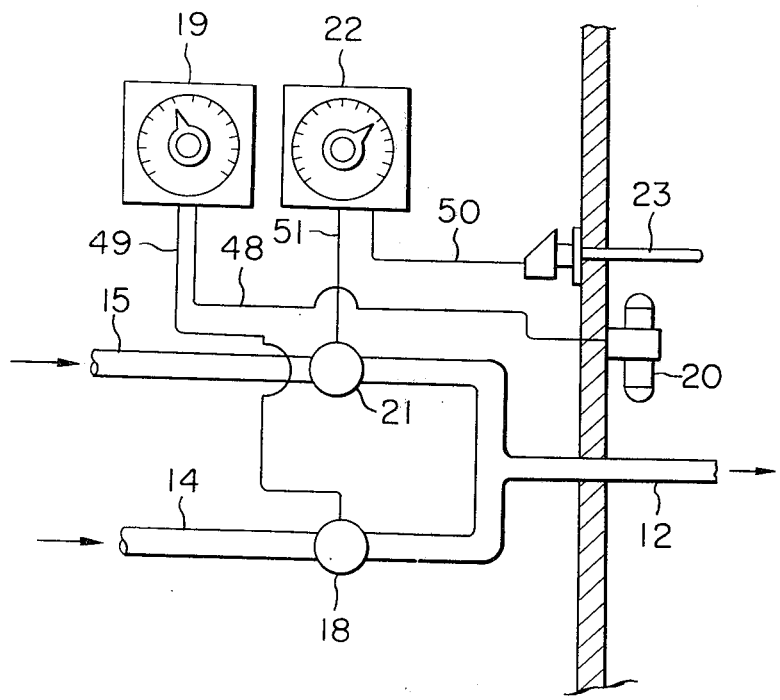
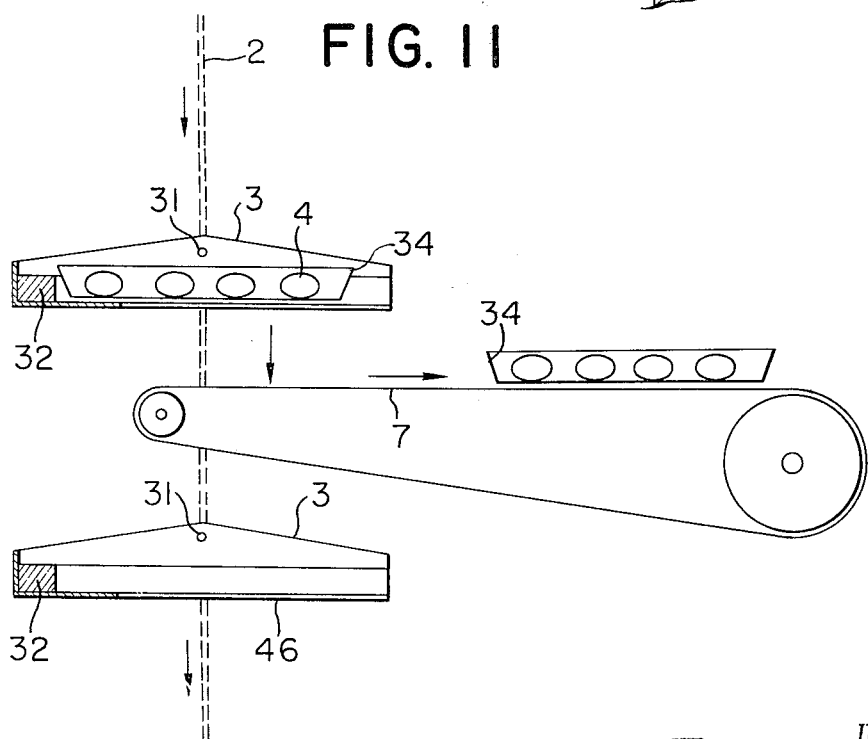

INVENTOR.
TORAHIKO HAYASHI
BY
Eliot S. Gerber
ATTORNEY.

AUTOMATIC DEVICE FOR FINAL PROOFING

This application is a continuation-in-part application based upon the earlier filed application Ser. No. 137,397, filed Apr. 26, 1971, having the title "Automatic Device and Process for Final Proofing", abandoned.

The present invention relates to an automatic device for the final proofing of dough materials and the mechanism as to the movement of trays within the device.

More particularly, the present invention relates to an automatic final proofer for dough materials such as bread dough, wherein the temperature and humidity are freely adjusted and, especially, to an automatic final proofer, which permits free adjustment of the proportion within the housing of the space at the optimum temperature and humidity, which is positioned on the uppermost levels.

Conventionally, the final proofing process has consisted of keeping in a housing commonly called a final proofer dough material divided into pieces and preformed for a certain length of time at the optimum temperature, i.e., commonly 40°–45°C, and the optimum humidity, i.e., commonly 70–90%, and taking out the dough materials when sufficient gas has been formed therein by the action of yeast fungi.

The optimum temperature and humidity within the final proofer and the optimum length of time for proofing, however, differ depending upon the kind of material. On some occasions, the length of time for proofing often varies depending upon the temperature of the material to be fed into the proofer, even if the composition of the materials is the same.

The automatic final proofer in the past has been made to adapt to these various conditions by varying the residence times of materials within the proofer. In the present-day baking industry, where the final proofing process is a process linked in a series of automatic processes, wherein bread dough is divided and formed by a machine at a predetermined speed and the baking process after the final proofing process is also conducted at a predetermined speed, it is very disadvantageous that the length of time for final proofing varies from occasion to occasion. It has been impossible to prepare different kinds of bread requiring widely different lengths of time for fermentation on the same single production line.

The present invention eliminates these disadvantages and provides a device which enables an automatic final proofing process far more efficient than that provided by the conventional devices.

According to the present invention, an automatic final proofer is provided which comprises a conveyor arranged to move upwards in a housing having in its wall a plurality of vertically distributed adjustable openings for the supply of heated gas and/or humid gas. More particularly, the device according to the present invention comprises a housing and a pair of chain-belts, which chain-belts are arranged to move within the housing carrying preformed dough materials; characterized by a number of vertically distributed openings on the wall of the housing for the supply of heated gas and/or humid gas, thereby permitting to determine freely the proportion within the entire housing of the space to be at optimum temperature and humidity which space is positioned on the uppermost levels. Again, the present invention provides a method for the final proofing of preformed dough materials for any given length of residence time of the dough materials, comprising moving the dough materials fed into the housing gradually upwards and supplying adjustable heated gas and/or humid gas into the housing from a plurality of vertically distributed openings.

The present invention also provides a mechanism for the movement of trays connected to said chain-belts for carrying dough materials, said trays being arranged to move without losing equilibrium in their horizontal movements and movements to upper levels through the entire passage within the housing.

More particularly, the mechanism in the present invention comprises trays, each of which is supported on its opposite sides by a pair of pins each projecting from a joint of each of a pair of chain-belts, the trays being thereby adapted to move by the movement of the chain-belts, each said tray being rotatable with the pins as the axes of rotation and said tray being weighted differently between the forward and rearward ends so as to make said tray incline in a fixed direction when hung on the pins; a sprocket for each of said chain-belts at each end of any of the horizontal paths of said chain-belts for the upward turns of the chain-belts; lever means, positioned at one end of said horizontal path, for supporting the weighted end of the tray; means, positioned at the other end of said horizontal path, to hold down the lighter end of the tray; and a horizontal support rail or rails laid along the substantial length of each of said horizontal paths to support said trays.

In a preferred embodiment of the present invention, the device has at a lower portion of the forward end of the housing an intake for dough materials placed on a plate carried forward to a place adjacent to the intake by a conveyor belt. The housing contains a pair of chain-belts positioned parallel to each other, which belts move horizontally from the intake to the rear of the housing, where said belts make a U-turn at a pair of sprockets to the second horizontal path higher than the first path by substantially the length of the diameter of the sprockets. The chain-belts make another turn at the end of the second path to a higher horizontal path and repeat the same process to the uppermost portion of the interior of the housing. After covering the uppermost path, the chain-belts turn at a pair of sprockets for a downward movement, passing through a take-out for the fermented dough materials on the plate and after arriving at the lowermost portion of the housing, return to the intake portion. The chain-belts are arranged to continue an endless circulation movement.

At each pair of sprockets to which the weighted end of the tray approaches in the movement of the tray towards the sprockets, there is a lever, positioned adjacent to one or both sprockets of each pair, the upper end of which lever is connected swingably to a fulcrum positioned upwardly and outwardly of a chain-belt and the other end of which is provided at a level slightly lower than the bottom of the tray with a hook projecting horizontally. When a pin of the chain-belt connected to the tray contacts the lower surface of the lever, along with the semi-circular upward motion of the pin of the chain-belt caused by the turn of the sprocket, the lever is caused to swing upwards and the hook catches the forward portion of the lower surface of the tray where the tray is weighted, and thereby prevents the lowering of the weighted end of the tray which is leaving the support rails when the chain-belts make a turn.

Adjacent to each pair of sprockets to which the lighter end of the tray approaches, there is a balancer means in the form of a plate for instance, which holds down the lighter portion of the tray which tends to be lifted up when it leaves the support rails along with the upward semi-circular motion of the pin connected to the tray.

Where the chain-belts turn for the downward movement there is provided a guide chain-belt which comes in contact with the lighter end of the tray at the portion of the belt which is sloped so as to prevent the tray from losing balance when the tray turns at right angles around the sprockets. The said guide chain-belt may be provided in duplicate to hold the tray at two places.

A further chain-belt is provided vertically along substantially the entire distance of the downward movement of the tray adjacent to the path of the lighter end of the tray. The said chain-belt moves at the same speed as the downward movement of the tray and is provided, at certain intervals which correspond to the position of the trays, with hooks, which, while the chain-belt is in motion, are positioned in such a manner that each of the hooks holds down the lighter end of each tray. The said vertical chain-belt may be in duplicate. At a certain position in the zone for the downward movement of the trays there is provided a take-out belt, whose inward end catches the plate laid with dough materials at the recess formed in the tray and conveys the plate forward to a further processing station.

At the lowermost place in the housing where the tray turns its direction from the downward movement to a horizontal movement, the weighted end of the tray will be slidably placed upon the support rails before the lighter end leaves the hook of the vertical chain-belt.

Outside the housing, there is provided means to supply heated gas and/or humid gas to the interior of the housing. The streams of gas are arranged to be fed into the housing through a number of openings distributed vertically along the side of the housing. It is further arranged that the openings can be freely selected for the feeding of the required gas for desirable lengths of time.

The device for the feeding of heated and/or humid gas may be of any conventional form. According to a preferred embodiment, heated steam from a boiler is conveyed through a pipe to a radiator for lowering the temperature of the steam and increasing the humidity to 100%. Dry air from a blower is made to pass a heater for heating. Each of the two lines for the humid steam and the heated dry air respectively is connected to a manifold being connected to the openings. Each of the openings may receive both the heated air and the humid steam, or independent opening may be provided for each of the streams of gas at adjacent places.

A motor-operated valve is provided for each of the heated air lines and the humid steam lines near the opening for each line. Also provided are a humidity detector and a temperature detector near each of the openings inside the housing so as to adjust the temperature and humidity of gas fed into the housing appropriately. These detectors detect respectively the temperature and humidity at certain levels of the interior of the housing. A temperature regulator and a humidity regulator provided with respect to each of the openings, compare the detected temperature and humidity with those indicated by the regulators, and transmit signals to the motor-operated valves, which, pursuant to the signals, open or close or otherwise control the lines.

In this manner, depending upon the requirements for fermentation, the optimum temperature and humidity zone may be formed in the upper most portion of the proofer by merely adjusting the automatic temperature and humidity regulators, and the optimum zone may be extended towards the lower levels of the proofer as the case may be. It is desirable that the optimum zone should be formed from the uppermost level of the proofer downwards. This prevents convection within the proofer. Since also the chain-belts move upwards, there is no counterflow of the air within the proofer which would take place, in case the chain-belts move downwards, because of the downward motions of the trays when they make turns for lower positions or otherwise.

Since, in the present invention, the length of time for proofing is determined by the proportion of the optimum temperature and humidity zone within the proofer, the length of the residence time for dough materials in the proofer need not be changed depending upon the requirements of fermentation contrary to the conventional devices. Also, the residence time of dough materials can be determined in conformity with the velocity of operations preceding and subsequent to the proofing process, because the temperature and humidity conditions within the proofer can be freely regulated. The present invention, thus, will bring about substantially complete automatic production lines of baking plants.

The present invention has also been successful in providing an improvement in the fermentation of dough materials. According to the present invention, temperatures within the proofer can be adjusted so as to increase the temperature gradually from the bottom to the uppermost level of the interior of the housing and this enables the exposure of the dough materials entering the proofer at a lower level to gradually higher temperatures along with the movement of the tray and along with the lapse of time. By this manner, the volume of a dough material substantially increases as compared the conventional fermentation process, wherein a dough material is merely placed in an atmosphere set at a uniform temperature and humidity. An experimentation conducted by the inventor on pieces of bread dough indicated an increase of 10%.

Another advantage of the present invention is that it has solved the problem as to how to maintain in equilibrium the horizontally spread out trays hung from a pair of chain-belts not only during the horizontal movement but also during turning motions by a combination of weighting on one end of the tray and counterbalancing means when the tray leaves the support rails.

An object of the present invention is to provide a device for the automatic final proofing of dough materials.

Another object of the present invention is to provide a device for the automatic final proofing which enables the obtaining of desired fermentation by adjusting fermentation conditions under a given residence time for dough materials.

A further object of the present invention is to provide a device for the automatic final proofing which enables the imparting of the optimum fermentation to dough materials by maximizing the length of movement of trays carrying dough materials within the proofer per given residence time and by forming the optimum temperature and humidity zone in the desired proportion as against the entire space within the proofer.

A still further object of the present invention is to provide a device for the automatic final proofing which enables uninterrupted feeding of dough materials and uninterrupted taking out of the proofed dough materials in a baking production line.

It is also an object of the present invention to provide a mechanism which enables the safe and smooth movement of trays within the proofer to meet the above objects.

The above, and other objects, features and advantages of the invention will be apparent in the following detailed description of illustrative embodiments thereof which is to be read in connection with the accompanying drawing wherein:

FIG. 3 is a schematic view showing the mechanism for the regulation of heated and/or humid streams of gas;

FIG. 11 shows the mechanism of the take-out; and

Figure 1:
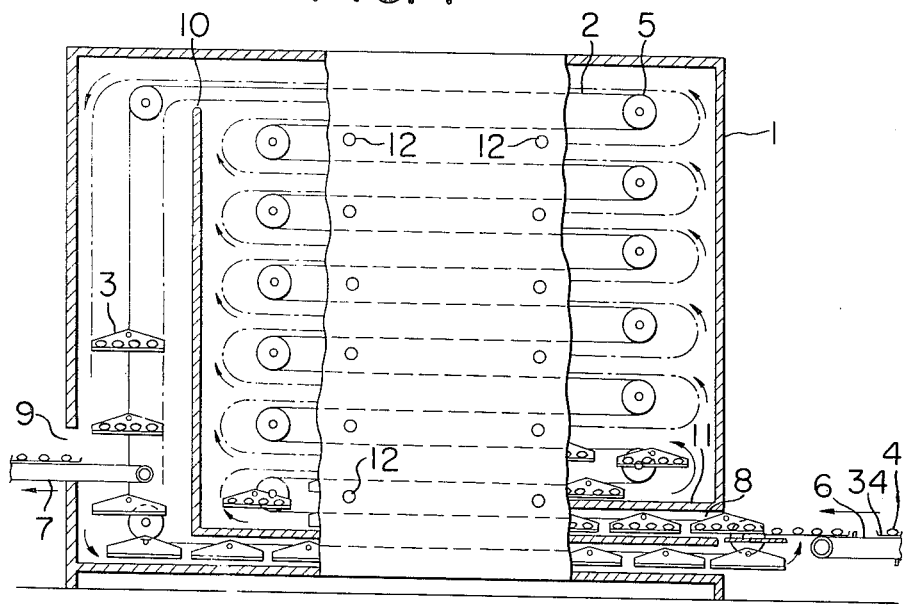
FIG. 1 is a partially broken away, schematic, front view of an embodiment of the present invention showing the interior of the housing of a final proofer and the arrangement of the pipes for the supply of heated and-/or humid streams of gas.

Referring to FIG. 1, the housing 1 is made of a heat insulating material. A pair of parallel chain-belts 2, of which the front belt is seen in the drawing, runs within the housing 1. The chain-belts 2 runs in the drawing from right to left on the second path from the bottom of the housing separated by a horizontal wall from the lowest path. The chain-belts 2, then, turn upwards at the left side of the housing 1 near the heat insulating wall 10 around a sprocket 5 in the direction of an arrow, and, after a number of horizontal movements and upward turns, downward movement and a final horizontal movement through the lowermost path, return to the starting position. A number of trays 3 are hung from the chain-belts. The trays 3 take up divided and preformed dough materials 4 placed on plates 34 at the intake 8 from the feedin conveyor belt 6, and transport them through the entire paths within the housing, and feed them out at the take-out 9 onto a take-out conveyor 7 after completion of the fermentation of the dough materials. The conveyor 7 takes up the dough materials together with the plate 34 on which the dough materials are placed. The path adjacent to the intake 8 is separated from the immediately upper path by a heat insulating wall 11.

The pipes 12 supply heated and/or humid gas into the housing, and are arranged vertically. Depending upon the length of the proofer, the pipes 12 may be provided in plural vertical arrangements. The arrangement of the pipes 12 need not be in a vertical line. So long as the pipes are distributed in the vertical direction, a staggered arrangement or otherwise may also be satisfactory.

Figure 2:
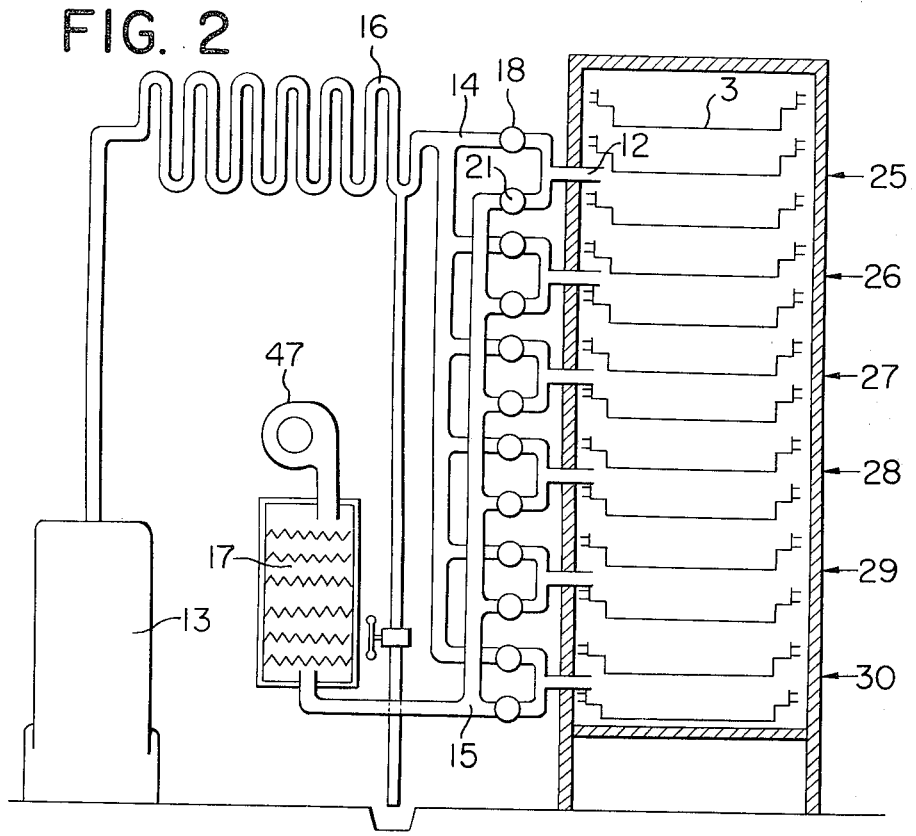
FIG. 2 is a schematic cross-sectional side view of the heated and humid gas supply device and the final proofer.

Referring to FIG. 2, the boiler 13 ordinarily supplies steam at the temperature of 120°C. The pipe connected to the boiler 13 conveys steam to a radiator 16, which lowers the temperature of the steam and raises the humidity to 100% and then feeds the humid steam to the humid steam supply pipe 14. Dry air fed from a blower 47 passes through a heater 17, which commonly set at 200°C and heightens the temperature of the air, thereby forming a stream of heated and dried gas. The gas then flows through the heated air supply pipe 15. The pipes 14 and 15 respectively branch off at manifolds to form as many lines as the number of openings and are eventually connected to the corresponding openings. On each of the pipes 14 and 15 is provided near the housing a motor-operated valve 18 and 21 respectively. The drawing indicates an embodiment wherein each pipe 14 and each corresponding pipe 15 are combined to form a single pipe 12 immediately before the corresponding opening. The two pipes, though, may have individual openings without being combined to form a single pipe 12.

The humidity detector 20 positioned inside the outer wall of the housing, as seen in FIG. 3, detects the humidity within the proofer, and sends a signal to the humidity regulator 19 through a humidity signal line 48. The humidity regulator 19 compares the detected humidity with the desired humidity indicated by the regulator. In case there is a difference between the detected humidity and the desired humidity, the humidity detector 19 sends an instruction signal, through a motor-operated valve instruction line 49, to the motor-operated valve 18, which controls the pipe 14. A similar function is achieved by a combination of the temperature detector 23 inside the outer wall of the housing, a temperature signal line 50, the humidity regulator 22, a motor-operated valve instruction line 51 and the motor-operated valve 21 so as to control the pipe 15.

There is a set of a temperature regulator and a humidity regulator and also a set of a temperature detector and a humidity detector for each pipe 12. Whereas each set of detectors 20 and 23 should be positioned adjacent to each pipe 12 in the same positional relationship, so as to be able to detect the effect of the heated and/or humid streams of gas precisely, the regulators 19 and 22 may be arranged systematically and in a compact manner on the operation panel 24.

Figure 4:
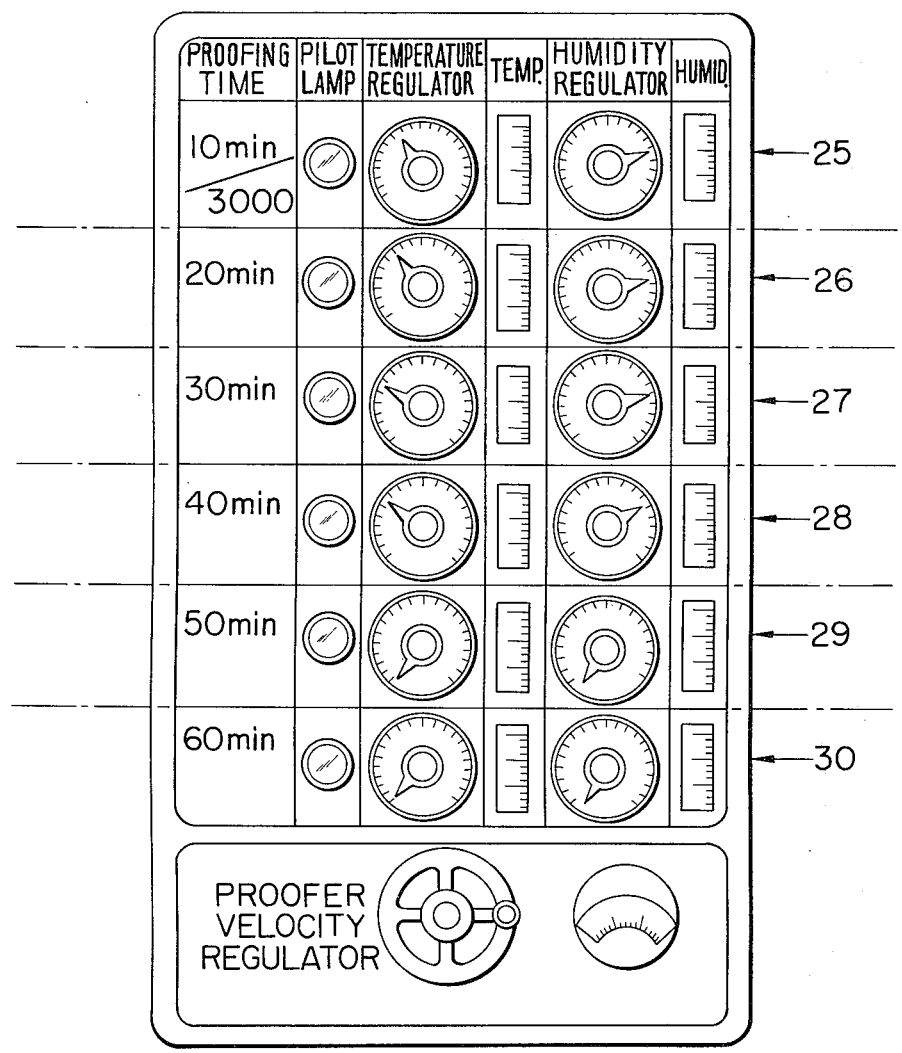
FIG. 4 is a front view of an operation panel showing the arrangement of the temperature and humidity indicators.

The operation panel board 24 in FIG. 4 is divided horizontally into six sections 25, 26, 27, 28, 29 and 30, each horizontal section corresponding to each of the vertically arranged pipes 12. The uppermost section 25 controls the uppermost level of the interior of the proofer, which is fed with the gas coming through the uppermost pipe 12. The second highest section 26 corresponds to the second highest level of the proofer and so forth.

The substantial portion of the panel board 24 is vertically divided into six sections, which from left to right in the drawing, are for the proofing time indicators, the pilot lamps, the temperature regulators, the detected temperature indicators, the humidity regulators and the detected humidity indicators. The proofing time indicator indicates the specific horizontal sections required for an operation of the proofer to complete the proofing of a certain number of dough materials at a given length of time. In case 3,000 pieces of dough material are to be processed in ten minutes, the horizontal section 25 is to be chosen. In case the same number of dough materials are to be processed in 20 minutes, the horizontal sections 25 and 26 are to be selected. In case 6,000 pieces of dough material are to be processed in ten minutes both sections 25 and 26 are to be operated. When the two sections 25 and 26 are used, pilot lamps for these sections are lit during operation. The other four vertical sections are self-explanatory. The lower portion of the panel board 24 provides a proofer velocity regulator which controls the velocity of the chain-belts.

Figure 5:
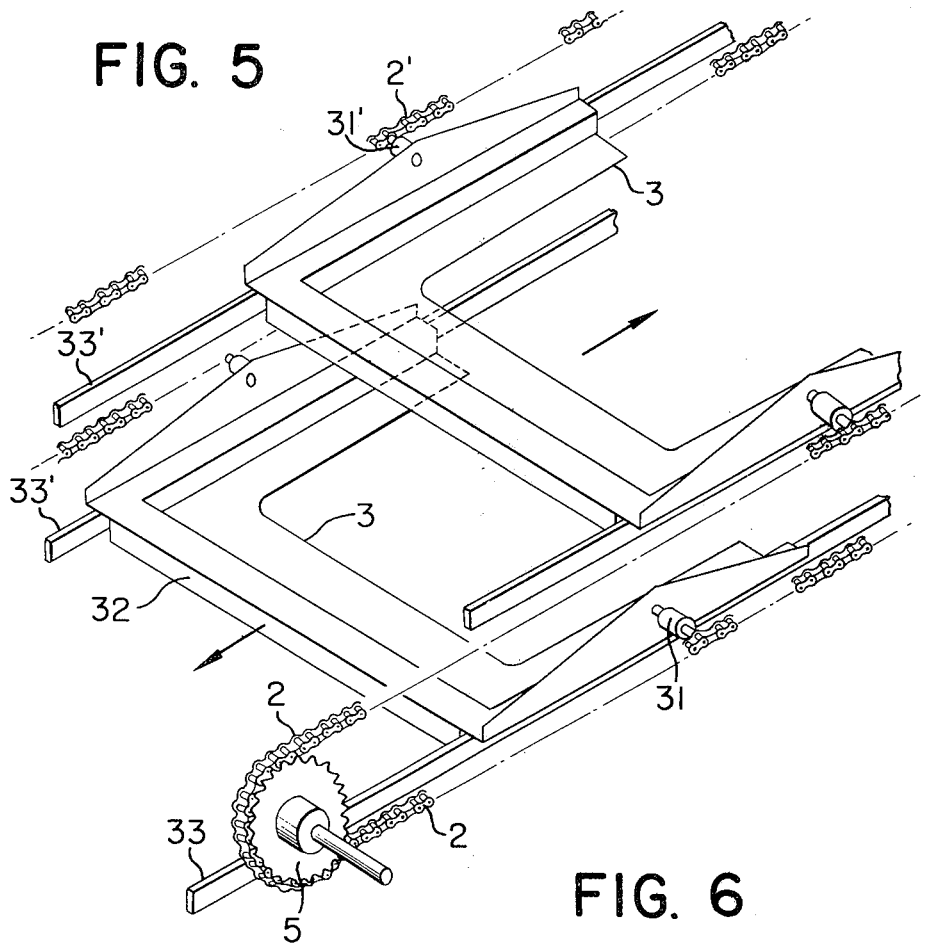
FIG. 5 is a perspective view showing the construction of the tray and its relationship with the chain-belts.

Referring to FIG. 5, the tray 3 is rotatably held on two sides by pins 31, 31' fixed in joints on each of the chain-belts 2, 2'. The tray 3 has a weight 32 as also seen in FIG. 11. The weight 32 imparts to the tray an imbalance as to the weight of the forward and rearward portions of the tray. In an embodiment of the present invention, the weight 32 is affixed to the end of the tray closer to the intake 8 along with the entire length of the end.

The tray has a wide flat surface for carrying dough materials, and therefore, if the tray was not equipped with the weight 32 and was hung from the pins 31, 31' without any other support, not only would it be impossible to keep the tray always horizontal but also the tray would be inclined in either direction in various degrees depending upon the frictional resistance of the pins of the chain-belts supporting the tray and the individual location of the dough materials on the tray and so forth. If such is the case, the tray cannot make any steady turn at the sprockets 5 without losing equilibrium after leaving the support rails. The present invention has solved the problem by making the tray incline always in the same direction by providing it with the weight 32 and counterbalancing the tray when it leaves the support rails by means such as levers and hold plates.

The tray 3 is supported on its horizontal path by a pair of support rails 33, 33'. One of the support rails may be omitted and a single rail may be positioned in the middle of the horizontal path depending upon the design. The support rails 33, 33' not only support the tray 3 horizontally during its horizontal movement, but also prevent the chain-belts 2, 2' from being bent by the weight of the tray. This enables the design of a proofer with long horizontal paths. The rails 33, 33' can be replaced by roller conveyors.

Figure 6:
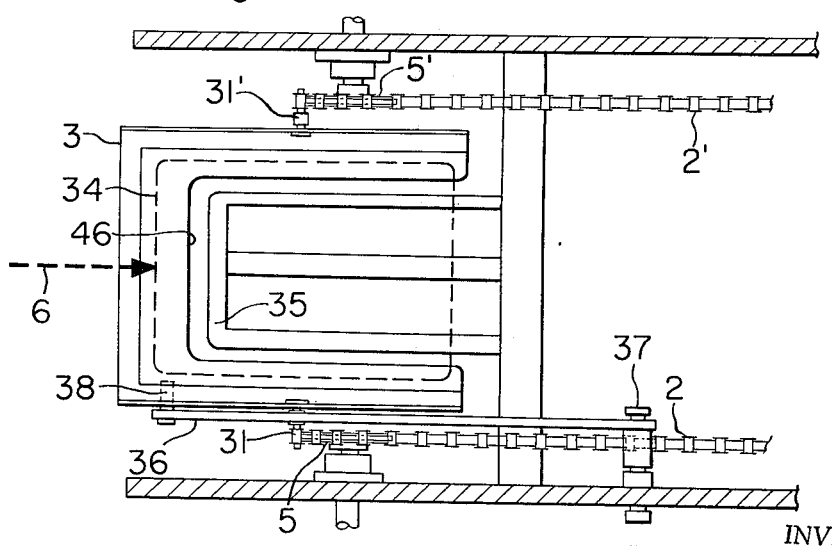
FIG. 6 shows the mechanism of the intake.
Figure 7:
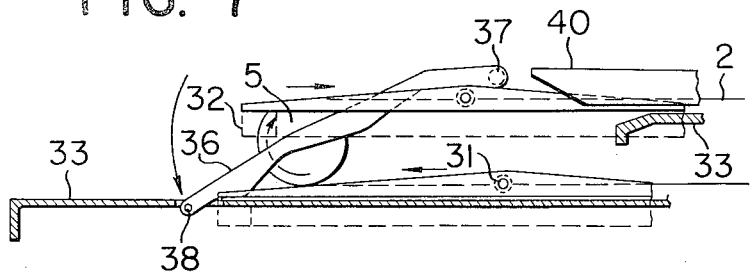
FIGS. 7, 8 and 9 show the mechanism to support the weighted end of the tray at its upward turn.
Figure 8:
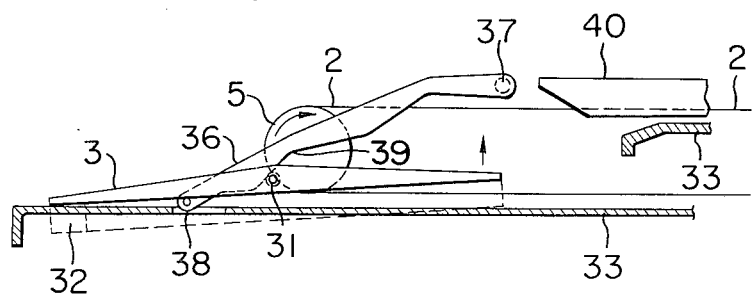
Figure 9:
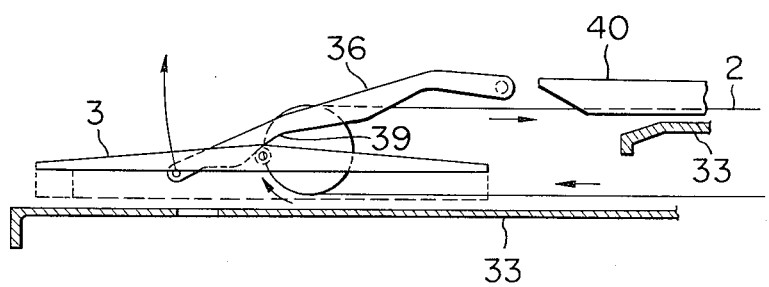
Figure 12:
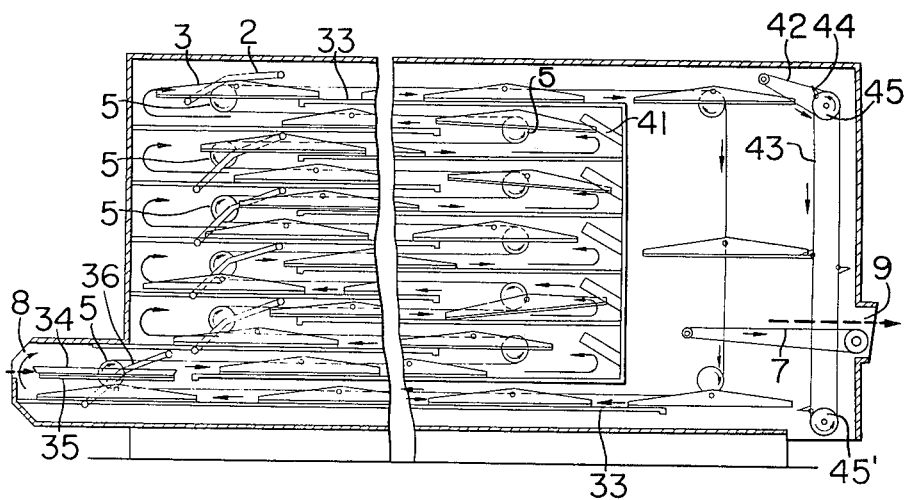
FIG. 12 is a cross-sectional rear view of an embodiment of the present invention focusing on the movement of trays.

The dough materials 4 laid on the plate 34 are carried forward by the conveyor 6 to the intake 8 of the proofer and placed on a receiver 35 as shown in FIG. 6 and FIG. 12. The tray coming upwards from below the receiver 35 along with the turn of the chain-belts 2, 2' takes up the plate 34 for final proofing. In order to facilitate the operation, the tray 3 has a recess 46 narrower in width than the plate 34 but wider in width than the receiver 35 and in such a form that, when the tray 3 makes an upward motion, it moves past the receiver 35 in such a positional relationship that the receiver 35 is surrounded by the recess 46 on three sides when the tray 3 comes into the same level as the receiver 35. Since the plate 34 is wider than the recess 46, it is picked up by the tray 3 for further processing.

Referring to FIGS. 6 through 9, a lever 36 is positioned near a sprocket 5 adjacent to the intake. A lever may be provided for each of the pair of chain-belts. The lever 36 is supported swingably at the fulcrum 37 fixed to a wall of the housing at a position upwardly and outwardly from a chain-belt 2. At the other lower end of the lever 36 there is a hook 38 projecting horizontally and inwardly from the lever 36. The hook 38 is ordinarily positioned slightly lower than the upper surface of the support rail 33. A slot may be provided in the support rail to receive the hook 38.

The lever 36 functions to hold up the weighted end of the tray 3 when it leaves the support rails 33, 33' as it takes an upward turn and to convey the tray to the support rails of the horizontal path immediately above the path from which the tray leaves.

As a tray approaches the end of the horizontal path carried by the pins 31 of the chain-belts, a pin touches a portion of the bottom surface of the lever, and lifts the lever when the pin turns upwards by the circular motion of the sprocket 5. When the lever 36 turns upwards around the fulcrum 37, the hook 38 touches a portion of the bottom surface of the tray on the side of the end where a weight 32 is affixed. A portion of the bottom surface constitutes a cam surface 39. It modifies the uneven rate of elevation of the hook 38 caused by the changes in the rate of elevation of the pin 31, which follows in its upward movement the semi-circular curve the sprocket delineates, and thus keeps the tray substantially horizontal all the way through its U-turn movement.

When the upward turn of the tray is completed, the lever 36 falls down to take its original position, losing the support of the pin 31. A hold plate 40 holds the lighter end of the upper surface of the tray on either side thereof to keep the equilibrium of the tray after the hook 38 of the lever leaves the bottom surface of the tray. Similar devices can be provided at each of the sprockets 5 to which the weighted end of the tray approaches.

Figure 10:
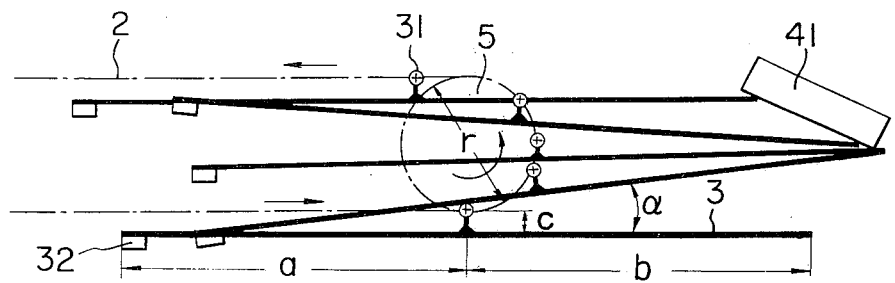
FIG. 10 shows the mechanism to support the lighter end of the tray at its upward turn.

On the other end of the second horizontal path, there is a balancer plate 41, which can also be plural. The mechanism of the balancer plate is illustrated in FIG. 10. The bottom surface of the plate 41 is sloped so that its end adjacent to the end of the horizontal path is lower than the other end, in such a degree as to keep the tray leaving the support rails as horizontal as possible. The lower surface of said plate 41 constitutes an inclination connecting a point which the lighter end of the tray contacts when the tray makes an upward turn around the sprocket before the tray inclines to such a degree that the safety of transportation becomes disturbed and a point from which the lighter end of the tray disengages the contact after the upward turn of the tray and when the weighted end thereof lands on the support rails of the upper horizontal path at angles such that the tray does not incline so as to disturb the safety of transportation.

When the chain-belts 2, 2' make an upward U-turn around the sprocket 5, the weighted end of the tray 3 remains on the support rails and the lighter end swings up. The balancer plate 41 minimizes the upward motion of the lighter end of the tray to secure the safe transportation of the dough materials. By the coaction between the semi-circular motion of the sprocket 5 and the slope of the balancer plate 41, the tray can maintain substantially horizontal positions, or at least safe positions for the holding in place of the dough materials, during the entire semi-circular movement and before the weighted end lands on the support rails on the one level higher horizontal path. The inclination of the bottom surface of the balancer plate 41 may either be straight or curved or otherwise so long as the plate 41 satisfies the above function.

It seems impossible to avoid a little inclination of the tray during its turning movement with its lighter end engaging the balancer plate 41. The following formula, however, may minimize the inclination $\alpha$:

$$a + b > r$$

wherein "$a$" is a distance between the weighted end of the tray and the point of the tray immediately below the pin 31; "$b$" is a distance between the lighter end of the tray and the point of the tray immediately below the pin 31; and "$r$" is the diameter of the sprocket 5. Further, the greater the difference between "$a + b$" and "$r$", the smaller the inclination of the tray. There is no requirement as to the relationship between the lengths of "A" and "B" as far as the above turning motion is concerned. Incidentally, in case of the turn at the intake, it is desirable that "$a$" is larger than "$b$" when "$a + b$" is fixed because it minimizes the initial inclination of the tray.

According to an example of the present invention, the maximum inclination $\alpha$ at the turn by the balancer plate 41 was 7° in a tray 3 carrying a rectangular plate 34 of 750 mm × 520 mm with its longer sides aligned with the direction of the movement of the tray, when "$a$" was 400 mm, "$b$" was 400 mm, "$c$" (the distance between the center of the pin and the bottom of the tray immediately below the pin) was 25 mm, and "$r$" was 160 mm. Also, in the case of the turn by the lever 36, there was momentarily an inclination of 6° at the initial stage of the turn under the same conditions as above, and there was no inclination at all during the entire remaining turning motion. The inclinations to the extent above do not impart any inconvenience to the transportation of dough materials. An experiment has confirmed that the tray can be inclined up to 15°.

The guide chain 42 is provided at the corner of the housing 1 where the tray 3 makes a turn from a horizontal movement to a downward movement. The chain 42 is designed to hold down the lighter end of the tray to keep it horizontal when the weighted end of the tray leaves the support rails and the tray completes its turning motion. The lower surface of the chain where the lighter end of the tray 3 contacts has an inclination connecting a point which the lighter end of the tray contacts before the weighted end of the tray leaves the support rails of the uppermost horizontal path and a point which the lighter end of the tray contacts when the tray is about to start its downward movement.

A vertical chain-belt 43 is driven by sprockets 45 and 45' adjacent to the vertical path of the tray for its downward movement. The chain-belt 43 moves down at the same velocity as the chain-belts 2, 2' and is provided with hooks 44 at certain intervals. The hook 44 holds the lighter end of the tray and keeps the tray horizontal during its downward movement.

At a certain point of the downward path of the tray, the tray passes the take-out section 9 as illustrated in FIG. 11. The inward end of the take-out conveyor 7 picks up the plate 34 from the tray. The conveyor 7 is located in a vertically overlapping positional relationship with the tray. The takeout operation is facilitated by the recess of the tray provided in such a space that the tray may freely pass the conveyor 7 when the tray moves past the conveyor, thereby enabling the conveyor to pick up the material carrying plate 34 from the tray.

The chain-belts 2, 2', at the lowest position of the downward path, make the tray turn from its downward movement to a horizontal movement around a sprocket, to return to the intake section, as illustrated in FIG. 12. Upon the weighted end of the tray being placed upon the support rails 33, the lighter end of the tray leaves the hook 44, caused by the conveyance of the tray away from the hook 44 by the turning of the sprocket.

Although the embodiments have been described in detail herein, it is to be understood that the present invention is not limited to the above and that various changes and modifications may be effected therein without departing from the spirit and scope of the present invention.

What is claimed is:

1. A device for the automatic proofing of preformed dough materials placed on a conveyor in a housing, said conveyor being arranged to move upwards, comprising a plurality of vertically distributed adjustable openings in the wall of the housing for the supply of gas, and, associated with each of a plurality of the openings, a temperature detector, a first group of motor operated valves, and a temperature regulator, wherein the first motor operated valves are controlled by the said temperature regulators; and associated with each of a plurality of the openings, a humidity detector, a second group of motor valves, and a humidity regulator, wherein the second motor operated valves are controlled by the said humidity regulators, a separate means to supply heated gas and separate means to supply humid gas, first means to convey said heated gas to a plurality of said openings, second means to convey said humid gas to a plurality of said openings, wherein said motor-operated valves are in each of said first and second conveyance means, each said temperature regulator associated with each of the first conveyance means, each said humidity regulator associated with each of the second conveyance means, and means to compare the humidity and temperature detected by said detectors at each opening with the humidity and temperature selected by said regulators and to transmit signals to the motor-operated valves to adjust the said openings.

2. A device for the automatic proofing of preformed dough materials, said device comprising a housing having a side wall, means to convey said preformed dough materials into said housing and upward within said housing and out of said housing, a gas supply, a plurality of vertically distributed openings in said side wall, a plurality of gas passage means each connecting at least one of said openings to the supply of gas, a plurality of temperature detectors to detect the gas temperature at different levels within the housing and each temperature detector producing signals, a plurality of humidity detectors within the the housing to detect the humidity at different levels within the housing and each producing signals, a plurality of motor operated valves each located in a gas passage means to control the supply of gas to an opening, said motor operated valves being operated by the signals transmitted from one or more of the said detectors, whereby the preformed dough materials are conveyed upwards within the housing through stratified and adjustable zones of controlled temperature and humidity so that fermentation may be completed near the top zone within the housing.

3. A device as in claim 2 and further comprising a predeterminable temperature regulator in which the temperature may be predetermined, a predeterminable humidity regulator in which the humidity may be predetermined, and means to compare the humidity and temperature detected by said detectors with the humidity and temperature predetermined by said regulators and to transmit signals to the said motor-operated valves.

4. A device for the automatic proofing of preformed dough materials, said device comprising a housing having a side wall, means to convey said preformed dough materials into said housing and upward within said housing and out of said housing, a humid gas supply, a heated gas supply, a plurality of vertically distributed adjustable openings in said side wall, a first plurality of gas passage means each connecting a plurality of said openings to the supply of heated gas, a second plurality of gas passage means each connecting a plurality of said openings to the supply of humid gas, and means to control said two gas supplies, whereby the preformed dough materials are conveyed upwards within the housing through stratified and adjustable zones of controlled temperature and humidity so that fermentation may be completed near the top zone within the housing.

5. A device for the automatic proofing of preformed dough materials, said device comprising a housing having a side wall, means to convey said preformed dough materials into said housing and upward within said housing and out of said housing, a first and a second gas supply, a plurality of vertically distributed adjustable openings in said side wall, a plurality of gas passage means each connecting one of said openings to both supplies of gas, a plurality of temperature detectors within the housing to detect the temperature of the gas within the housing at different levels and each temperature detector producing signals, a plurality of humidity detectors within the housing each producing signals to detect the humidity at different levels within the housing, a plurality of motor operated valves each located in a gas passage means to control the supply of each gas to an opening, said motor operated valves being operated by the signals transmitted from one or more of the said detectors, whereby the preformed dough materials are conveyed upwards within the housing through stratified and adjustable zones of controlled temperature and humidity so that fermentation may be completed near the top zone within the housing.

* * * * *